United States Patent
Koishikura et al.

(10) Patent No.: US 7,982,158 B2
(45) Date of Patent: Jul. 19, 2011

(54) METHOD OF MANUFACTURING DIE FOR FORMING HONEYCOMB STRUCTURE AND DIE FOR FORMING HONEYCOMB STRUCTURE

(75) Inventors: Masaaki Koishikura, Nagoya (JP); Masayuki Hironaga, Tokai (JP)

(73) Assignee: NGK Insulators, Ltd., Nagoya (JP)

( * ) Notice: Subject to any disclaimer, the term of this patent is extended or adjusted under 35 U.S.C. 154(b) by 985 days.

(21) Appl. No.: 11/851,071

(22) Filed: Sep. 6, 2007

(65) Prior Publication Data
US 2008/0017520 A1 Jan. 24, 2008

Related U.S. Application Data

(63) Continuation of application No. PCT/JP2006/305413, filed on Mar. 17, 2006.

(30) Foreign Application Priority Data

Mar. 17, 2005 (JP) .................................. 2005-076471

(51) Int. Cl.
*B23H 1/00* (2006.01)
*B23H 9/00* (2006.01)
*B23H 9/02* (2006.01)

(52) U.S. Cl. .................................................. 219/69.17
(58) Field of Classification Search ............... 219/69.17, 219/69.2; 29/557, 558
See application file for complete search history.

(56) References Cited

U.S. PATENT DOCUMENTS

| 4,290,743 | A | * | 9/1981 | Suzuki ........................... 425/461 |
| 4,310,742 | A | * | 1/1982 | Pfau ............................. 219/69.17 |
| 4,361,745 | A | * | 11/1982 | Rupert et al. ............... 219/69.13 |
| 5,728,286 | A | | 3/1998 | Suzuki et al. |
| 6,193,497 | B1 | * | 2/2001 | Suzuki ........................... 425/461 |
| 2005/0118296 | A1 | | 6/2005 | Kaneko et al. |
| 2005/0147707 | A1 | | 7/2005 | Nate et al. |

FOREIGN PATENT DOCUMENTS

| JP | A 8-169005 | 7/1996 |
| JP | A 9-57538 | 3/1997 |
| JP | B2 3080563 | 6/2000 |
| JP | A 2000-326318 | 11/2000 |
| JP | A 2003-285308 | 10/2003 |
| JP | A 2003-285309 | 10/2003 |

* cited by examiner

*Primary Examiner* — Geoffrey S Evans
(74) *Attorney, Agent, or Firm* — Oliff & Berridge, PLC

(57) ABSTRACT

A method for manufacturing a die to be used for formation of honeycomb structure, the die having a die base having two faces, honeycomb-shaped slits 5 being formed in one face and back holes communicating with the slits 5 being formed in the other face in order to introduce a forming material thereinto, at least the slit portions of the die being made of a super had alloy, wherein slits 5 are formed by grinding or electric discharge machining, then a discharging electrode 40 having a square-shaped section is disposed near each crossing portion of slits 5, and electric discharge machining is conducted from the upper side of slit 5 toward the depth direction of slit.

11 Claims, 13 Drawing Sheets

20 TIMES

100 TIMES

500 TIMES

900 TIMES

METHOD OF MANUFACTURING DIE FOR FORMING HONEYCOMB STRUCTURE AND DIE FOR FORMING HONEYCOMB STRUCTURE

This is a Continuation of Application No. PCT/W2006/305413, filed Mar. 17, 2006, which in turn is a PCT Application, which claims the benefit of Japanese Applications No. 2005-076471 filed Mar. 17, 2007. The disclosure of the prior applications is hereby incorporated by reference herein in its entirety.

TECHNICAL FIELD

The present invention relates to a method for manufacturing a die to be used in formation of honeycomb structure and a die used in formation of honeycomb structure. More particularly, the present invention relates to a method for manufacturing a die to be used for formation of honeycomb structure, which die realizes high formability and has high abrasion resistance, as well as to a die to be used for formation of honeycomb structure.

BACKGROUND ART

For formation of a ceramic-based honeycomb structure, there has been widely used a method of conducting extrusion by the use of a die for formation of honeycomb structure, having a die base comprising back holes for introducing a forming material (a puddle) thereinto and slits (e.g. slits having a lattice shape) communicating with the back holes.

In the die, there are provided, at one face of the die base, slits of, for example, lattice shape, each having a width corresponding to the partition wall thickness of a honeycomb structure to be formed with the die and, at the opposite face (the other face), back holes communicating with the slits. The back holes are provided ordinarily so as to correspond to the positions at which the slits of lattice or other shape intersect each other, and the slits and the back holes communicate with each other inside the die base. Accordingly, a forming material (e.g. a ceramic material) introduced from the back holes moves from the back holes of relatively large inner diameter into the slits of small width, and is extruded from the opening portion of each slit as a honeycomb formed body.

In one method for manufacturing the die base, a metal block is subjected to drilling or the like at its one face to form a plurality of back holes and to grinding, electric discharge machining or the like at the other face to form slits communicating with the back holes. In this case, when the die base is for formation of a honeycomb structure having a square cell section, slits are formed along the contour of the square that is, the slits intersect each other at right angles and, when the die base is for formation of a honeycomb structure having a hexagonal cell section, slits are formed along the contour of the hexagon; the crossing portion of slits are allowed to correspond to the back holes.

As the die base constituting the die to be used for formation of honeycomb structure, there are used, for example, a plate-shaped member (a die precursor) made of one kind of alloy (e.g. stainless steel alloy or super hard alloy) and a plate-shaped member (a die precursor) obtained by bonding two different kinds of plate-shaped members (see, for example, Patent Literatures 1 and 2).

First, the die base made of stainless steel or the like is low in abrasion resistance and, therefore, has a problem that the slits wear in continuous extrusion and the shape of honeycomb formed body extruded changes gradually; in order to prevent it, there is ordinarily formed, on the surface of the die base, a coating layer [e.g. a plating layer (an electrolytic plating] or a titanium-based film (CVD or PVD)].

In the die base provided with a coating layer, appropriately curved surface parts (R shape parts) are formed at each slit intersection and, moreover, the coating layer wears gradually and slowly; as a result, the honeycomb formed body extruded can maintain an intended shape.

When the coating layer has worn to a level higher than specified, the die base is replaced with a new die base body; the old die base body is subjected to thorough complete removal of coating layer; the resulting die base body is provided with a fresh coating layer and then subjected to pattern adjustment; thus, regeneration of die base body is conducted. However, the regeneration of die base body requires much labor and time and further there is a limit in the times of regeneration; thus, the regeneration of die base body has had a problem of high cost.

Meanwhile, the die base made of a super hard alloy is superior in abrasion resistance and, therefore, is strikingly low in slit abrasion; accordingly, this die base body can be used over a long period of time with substantially no maintenance.

However, when slits have been formed in the die base made of a super hard alloy by grinding or electric discharge machining, each intersection of slits has no appropriately curved surface part (no R shape part) at the corners and has, as shown in FIG. 12(b), corners 30 of acute angle in slit crossing portion D; consequently, there has been, in extrusion of honeycomb formed body, a problem of inferior formability (e.g. occurrence of partition wall breakage) or inferior properties (e.g. low isostatic strength) of honeycomb formed body.

Further, being a fragile material, the super hard alloy has had a risk that the die made thereof undergoes, during extrusion, concentrated stress at the corners of slit intersection, resulting in breakage of die. Furthermore, when a coating layer is formed on the die base made of a super hard alloy as in the case of the die base made of stainless steel or the like, the formation of coating layer is conducted mainly by electrolytic plating; in case of using super hard alloy, the die base is deteriorated by an acid or alkali used in a plating solution or in a cleaning step and a fragile layer is formed on the surface of super hard alloy; resultantly, the die base is deteriorated in abrasion resistance and no merits attributed to the use of super hard alloy has been obtained. Even if the formation of coating layer is made by other means, much labor and time are required, inviting a high cost; thus, there has been a problem that there is no advantage of using a die base made of a super hard alloy.

In order to solve the above problems, there is, for example, a method of forming, by electrolytic machining, a R art at each corner of slit intersection of die base body (see, for example, Patent Literature 3). However, electrolytic machining apparatus, regardless of the kind of electrolytic solution used therein, has not spread widely among ordinary die manufactures, as compared with electric discharge machining apparatus, and the wide use of the above method is difficult. Further, when the slit portion of die base body is made of a super hard alloy, such a super hard alloy contains tungsten carbide and Co as a binder and, in particular, tungsten carbide is hardly ionized; therefore, it is easily considered that tungsten carbide is accumulated, during electrolytic machining, between the electrode and the slits as chips, making intended electrolytic machining impossible. Furthermore, since there is used, as the electrolytic solution, a strong alkali or a strong acid, the super hard alloy portion is deteriorated and the handling of electrolytic machining apparatus is dangerous, requiring a very high cost for the safety measure, etc. of facility; thus, the wide use of the above method is difficult. Meanwhile, in electric discharge machining, an oil is usable as the electric discharge machining solution, the handling thereof is easy, and the corrosion of super hard alloy is minimized; therefore, it is being investigated to form an appropriately curved surface part (reverse R part or circle) in each rib of discharging electrode (rib electrode for electric discharge machining) in order to transcribe that part on each slit intersection of the die base made of a super hard alloy. However, this has not been realized because the number of the abovementioned rib of discharging electrode (rib electrode for electric discharge machining) is many (20,000, for example) and, moreover, the electrode per se is exhausted by the joule heat generated during electric discharge machining, unlike in electrolytic machining.

Patent Literature 1: JP-A-2000-326318
Patent Literature 2: JP-A-2003-285308
Patent Literature 3: JP-3080563

DISCLOSURE OF THE INVENTION

The present invention has been made in view of the above problems. The present invention aims at providing a method for manufacturing a die to be used for formation of honeycomb structure, which die realizes high formability at a low cost and has high abrasion resistance, and a die to be used for formation of honeycomb structure.

In order to achieve the above aim, the present invention provides the following method for manufacturing a die to be used for formation of honeycomb structure and the following die to be used for formation of honeycomb structure.

[1] A method for manufacturing a die to be used for formation of honeycomb structure, the die having a die base having two faces, honeycomb-shaped slits being formed in one face and back holes communicating with the slits being formed in the other face in order to introduce a forming material thereinto, at least the slit portions of the die being made of a super hard alloy, wherein slits are formed by grinding or electric discharge machining, then a discharging electrode having a square-shaped section is disposed near each crossing portion of slits, and electric discharge machining is conducted from the upper side of slit toward the depth direction of slit.

[2] A method for manufacturing a die to be used for formation of honeycomb structure according to [1], wherein the discharging electrode is an electrode of approximately square shape having a side length at least equal to or larger than the diagonal length of slit crossing portion, the discharging electrode is disposed so that the diagonal direction of discharging electrode and the diagonal direction of slit intersection make an approximately 45 degree angle, and electric discharge machining is conducted from the upper side of slit toward the depth direction of slit.

[3] A method for manufacturing a die to be used for formation of honeycomb structure according to [1] or [2], wherein each corner of slit intersection is formed so as to have a R shape by deciding at least one electric discharge machining condition selected from pulse current, applied voltage, time length and times.

[4] A method for manufacturing a die to be used for formation of honeycomb structure according to any of [1] to [3], wherein each corner of slit intersection has a radius of curvature of 0.03 to 0.7 mm.

[5] A method for manufacturing a die to be used for formation of honeycomb structure according to any of [1] to [4], wherein at least the slit portions of the die are made of a tungsten carbide-based super hard alloy containing at least tungsten carbide.

[6] A method for manufacturing a die to be used for formation of honeycomb structure according to any of [1] to [5], wherein, in conducting electric discharge machining from the upper side of slit toward the depth direction of slit, first electric discharge machining is conducted to remove each corner of slit intersection and then second electric discharge machining is conducted at least once to allow each corner of slit intersection to have a R shape.

[7] A method for manufacturing a die to be used for formation of honeycomb structure according to [6], wherein an unused discharging electrode is used in the first electric discharge machining.

[8] A method for manufacturing a die to be used for formation of honeycomb structure according to [6] or [7], wherein at least a discharging electrode subjected to the first electric discharge machining is used in the second electric discharge machining.

[9] A method for manufacturing a die to be used for formation of honeycomb structure according to any one of [6] to [8], wherein a discharging electrode subjected to the first electric discharge machining has a shape on which the appearance of slit crossing portion after first electric discharge machining has been transcribed and is chamfered at the transcribed part.

[10] A method for manufacturing a die to be used for formation of honeycomb structure according to any one of [6] to [9], wherein electric discharge machining is conducted while a discharging electrode having a shape on which the appearance of slit crossing portion after first electric discharge machining has been transcribed and being chamfered at the transcribed part, is being brought close to the slit crossing portion.

[11] A method for manufacturing a die to be used for formation of honeycomb structure according to any one of [1] to [10], wherein the discharging electrode is formed so as to have a section smaller than or equal to the section of each slit formed in the die and the discharging electrode is divided in two or four parts in a 45° direction relative to the intersecting direction of slits.

[12] A die to be used for formation of honeycomb structure obtained by a method for manufacturing set forth in any one of [1] to [11].

[13] A die to be used for formation of honeycomb structure, according to [12], which has a slit width of 0.05 mm to 0.5 mm.

The method for manufacturing a die to be used for formation of honeycomb structure according to the present invention realizes high formability at a low cost, and the die to be used for formation of honeycomb structure, obtained by the method has high abrasion resistance and can therefore be used over a long period of time with substantially no maintenance.

BRIEF DESCRIPTION OF THE DRAWINGS

FIG. 5(a) is a front view schematically showing the die and FIG. 5(b) is an enlarged view schematically showing the portion A of FIG. 5(a).

FIG. 12(a) is a front view schematically showing the die and FIG. 12(b) is an enlarged view schematically showing the portion C of FIG. 12(a).

EXPLANATION OF NUMERALS IN THE DRAWINGS

1; a die to be used for formation of honeycomb structure, 2; a die base, 3; a first member (a plate-shaped member), 4; a second member (a plate-shaped member), 5; a slit, 6; a back hole, 7; a face (one face), 8; a face (the other face), 9; a bonded surface, 12; a honeycomb structure, 13; a partition wall, 14; a cell, 17a to 17d are each a slit block, 21; a die to be used for formation of honeycomb structure, 22; a die precursor, 23; a first member, 24; a second member, 25 and 25a are each a slit, 26; a back hole, 27; a face (one face), 28; a face (the other face), 30; a corner, 32; chamfered part (a R shape part), 33; removed corner part (a C surface part), 40; an electrode (before electric discharge machining), 42; an electrode (after electric discharge machining), 50; a electric discharge machining electrode (a rib electrode for electric discharge machining), 52; a base, 54; a rib (a rib electrode), 60; concentrated electric discharge machining to corner, and 70; a electric discharge machining electrode.

BEST MODE FOR CARRYING OUT THE INVENTION

In-depth description is made below on the method for manufacturing a die to be used for formation of honeycomb structure and the die to be used for formation of honeycomb structure, obtained by the method, both of the present invention, based on specific embodiments thereof. However, the present invention is in no way restricted thereto, and various changes, modifications and improvements can be made based on the knowledge possessed by those skilled in the art, as long as there is no deviation from the scope of the present invention.

The present invention lies in a method for manufacturing a die to be used for formation of honeycomb structure, the die having a die base having two faces, honeycomb-shaped slits being formed in one face and back holes communicating with the slits being formed in the other face in order to introduce a forming material thereinto, at least the slit surface being made of a super hard alloy, wherein slits are formed by grinding or electric discharge machining, then a discharging electrode having a square-shaped section is disposed near each intersection of slits, and electric discharge machining is conducted from the upper side of slit toward the depth direction of slit to allow each corner of slit intersection to have a R shape.

Incidentally, the slits are formed by grinding or electric discharge machining so that they produce independent cells surrounded by them.

Figure 1:
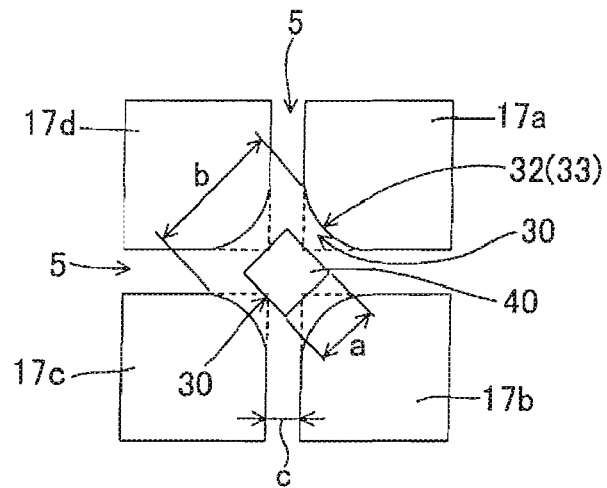
FIG. 1 shows an example of the method for manufacturing a die to be used for formation of honeycomb structure according to the present invention, and is a front view schematically showing a state of slit intersection in first electric discharge machining.
Figure 3:
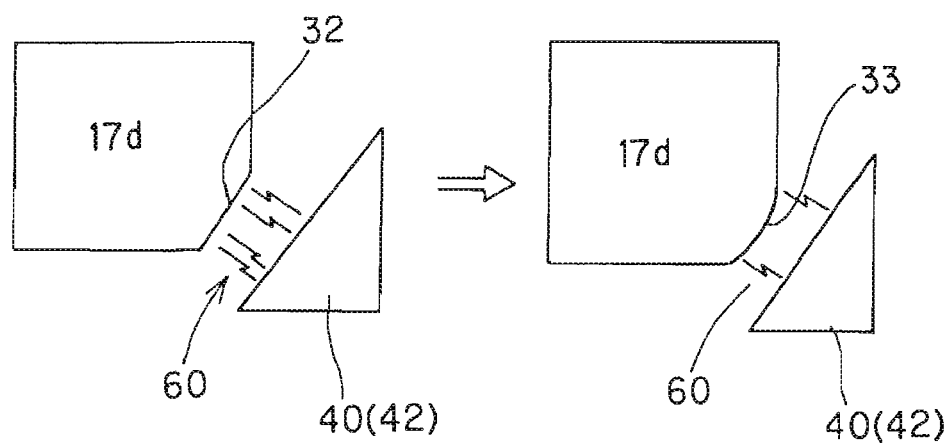
FIG. 3 is a view showing a state in which a slit intersection (a slit block) is undergoing discharge by a discharging electrode.

The main feature of the method for manufacturing a die to be used for formation of honeycomb structure according to the present invention lies in that, as shown in, for example, FIG. 1, when each slit 5 is formed by grinding and then each corner 30 thereof is processed by electric discharge machining, the corner 30 of slit 5 crossing portion (see slit blocks 17a to 17d) is allowed to have a R shape by setting high the pulse current used in discharging. In general, the position of electric discharge machining is determined based on the distance of discharging if same voltage is applied; therefore, as shown in FIG. 3, each of the slit blocks 17a to 17d comes to have a C surface by discharging 60 to a given distance from an electrode 40. However, since the potential gradient is high at the edges of C surface, discharging concentrates on the C surface edges (concentrated discharging 60) when a current of certain level or higher is applied and scattered to location where discharging has been once applied; therefore, the C surface turns gradually to a R shape and the corner 30 can be made into a R shape. Incidentally, the R shape and the R dimension can be controlled by controlling the pulse current or voltage applied.

Figure 12:
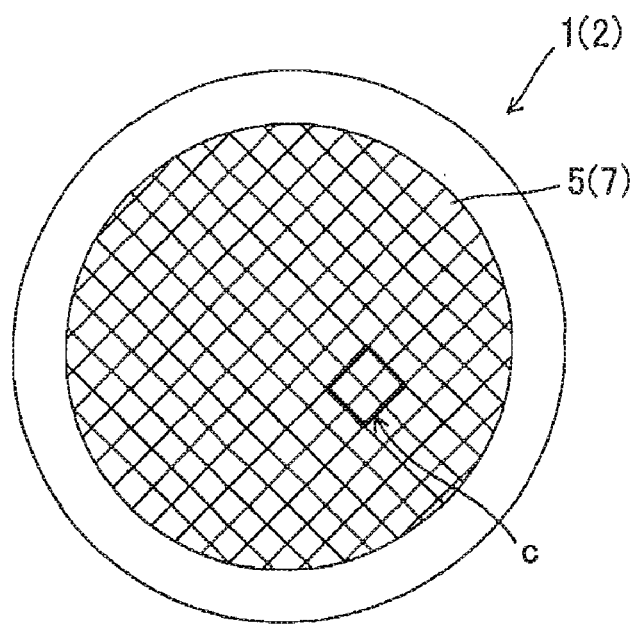
FIG. 12 shows a conventional die to be used for formation of honeycomb structure.
Figure 12:
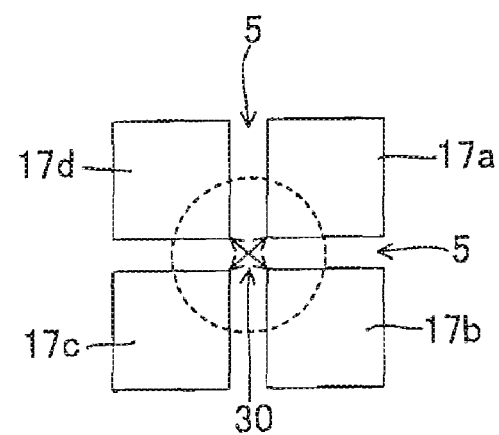

Thus, in the method for manufacturing a die to be used for formation of honeycomb structure according to the present invention, it is possible, as shown in FIG. 1, to remove each corner 30 (see FIG. 12) of slit 5 crossing portion (intersection) D and form, at a high precision, an appropriately curved part [see a C shape part: 33 of FIG. 5(b), or a R shape part: 32 of FIG. 1]; as a result, there can be eliminated reduced formability during extrusion (e.g. occurrence of partition wall breakage) or inferior properties (low isostatic strength) of honeycomb formed body obtained.

Figure 18:
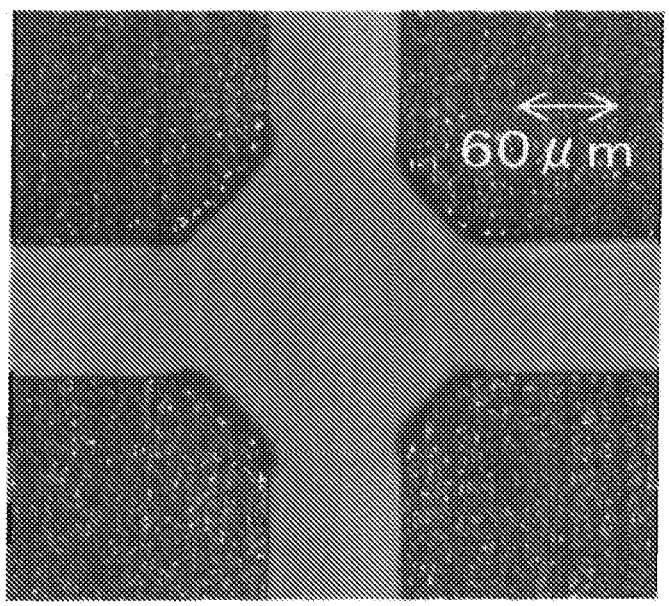
FIG. 18 is a photograph showing the surface shape of the slit intersection in first electric discharge machining (one time), obtained by a conventional method for manufacturing a die to be used for formation of honeycomb structure (Comparative Example 1).

In the method for manufacturing a die to be used for formation of honeycomb structure according to the present invention, the pulse current used during electric discharge machining is preferably 2 to 20 A, more preferably 2 to 15 A, further preferably 2 to 10 A. With a pulse current of less than 2 A, it is difficult to allow the corner of slit intersection to have a sufficient R shape. Meanwhile, with a pulse current of more than 20 A, there is a high probability of rib damage of discharging electrode. Incidentally, in the conventional method for manufacturing a die to be used for formation of honeycomb structure, the pulse current used in electric discharge machining has been about 0.5 to 1 A and no R shape has been obtained, as shown in FIG. 18.

In the method for manufacturing a die to be used for formation of honeycomb structure according to the present invention, the radius of curvature at slit intersection is preferably 0.03 mm to 0.15 mm, more preferably 0.03 mm to 0.12 mm, further preferably 0.03 to 0.1 mm in the case of a carrier having a rib thickness of 50 μm and a cell density of 900 cells/in$^2$, and is preferably 0.03 mm to 1.2 mm, more preferably 0.03 mm to 1 mm, further preferably 0.03 to 0.8 mm in the case of a carrier having a rib thickness of 500 μm and a cell density of 100 cells/in$^2$. The reason is as follows. When the radius of curvature is less than 0.03 ml and when partition wall breakage has occurred in the honeycomb structure manufactured with such a die, particularly near its outer wall, stress concentration tends to take place, resulting in a reduced isostatic strength. Meanwhile, when, in a carrier having a rib thickness of 50 μm and a cell density of 900/in$^2$, the radius of curvature is more than 0.15 mm or when, in a carrier having a rib thickness of 500 μm and a cell density of 100/in$^2$, the radius of curvature is more than 1.2 mm, too much puddle concentrates at each intersection and, particularly in the case of a die wherein back holes are arranged in every other portion, the size of intersection is too large, which disturbs the supply balance of puddle, greatly deforms the ribs formed and causes a reduction in isostatic strength. In the case of a carrier having a large porosity, there is no sufficient compression bonding of puddle at the rib portion and there appears breakage of rib during extrusion; thus, no effect is obtained for solution of the problems.

Figure 6:
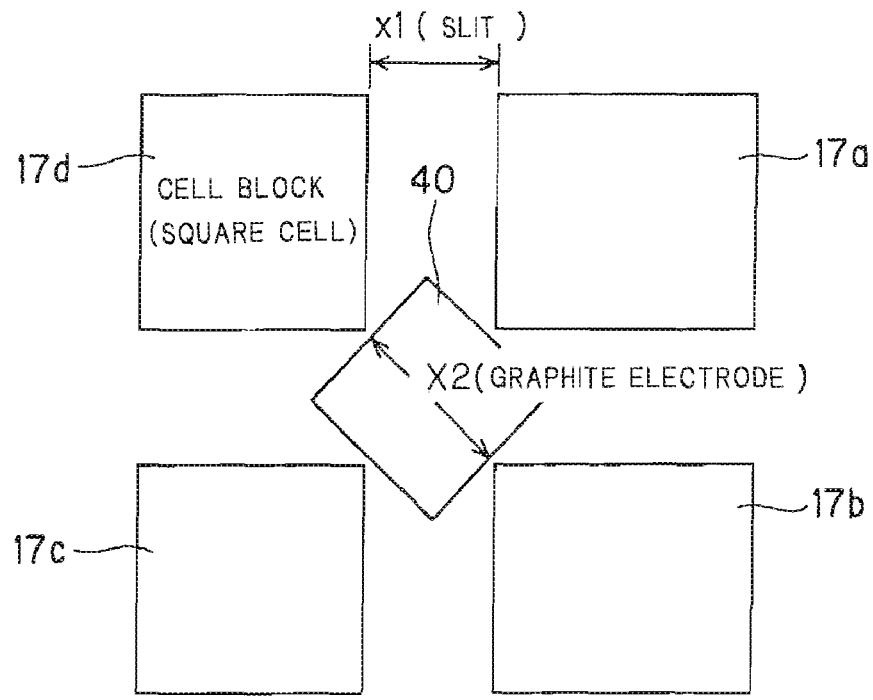
FIG. 6 is a view showing a relation between the slit width of die corresponding to square cell and the width of discharging electrode.

The discharging electrode 40 used in the present invention, when used for a die for formation of honeycomb structure of square cells, such as shown in FIG. 6, is preferred to be an approximately square electrode whose side length x2 is equal to or larger than the diagonal length x1 of slit crossing portion D and be disposed so that the diagonal direction of discharging electrode 40 and the diagonal direction of slit crossing portion D make an approximately 45 degree angle. Here, the relation between the diagonal length x1 of slit crossing portion D and the side length x2 of discharging electrode 40 is preferably $1 \leq x2/x1 \leq 3$, more preferably $1.414 \leq x2/x1 \leq 3$. At x2/x1=1.414, the discharging electrode 40 and the slit crossing portion D contact with each other and, therefore, it is desirable that the discharging electrode 40 has a section larger than that, from the standpoint of the life.

Figure 7:
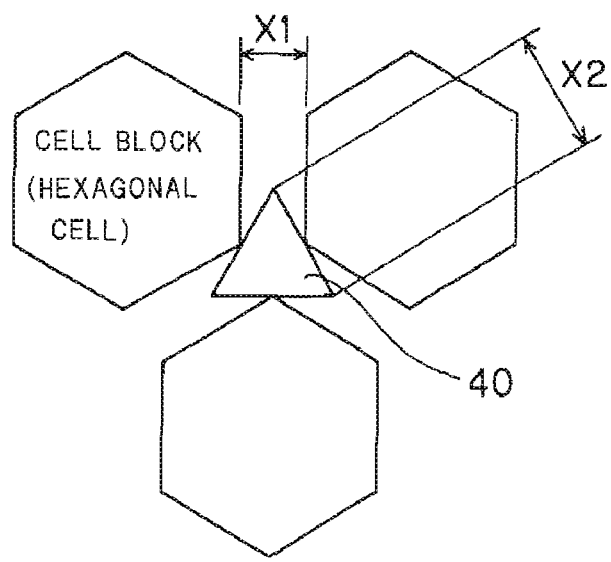
FIG. 7 is a view showing a relation between the slit width of die corresponding to hexagonal cell and the width of discharging electrode.

FIG. 7 shows a relation between a die for formation of honeycomb structure of hexagonal cells and a discharging electrode 40. In this case, the discharging electrode 40 used has a section of approximately regular triangle. In this case, the relation between the slit width x1 and the side length x2 of discharging electrode 40 is preferably $1 \leq x2/x1 \leq 3$, more preferably $2 \leq x2/x1 \leq 3$. At x2/x1=2, the discharging electrode 40 and the slit crossing portion D contact with each other and, therefore, it is desirable that the discharging electrode 40 has a section larger than that, from the standpoint of the life.

Next, in the method for manufacturing a die to be used for formation of honeycomb structure according to the present invention, it is preferred that, in conducting electric discharge machining from the upper side of slit toward the depth direction of slit, first electric discharge machining is conducted to remove each corner of slit and then second electric discharge machining is conducted at least once to allow each slit corner to have a R shape.

By conducting the first electric discharge machining to remove each corner of slit and then conducting the second electric discharge machining at least once, the R shape formation at slit intersection can be conducted at a higher precision.

In the method for manufacturing a die to be used for formation of honeycomb structure according to the present invention, slits are formed by grinding or electric discharge machining and subsequent electric discharge machining for finishing work. In this finishing work, first electric discharge machining is conducted to remove each corner 30 of slit 5 intersection (see FIG. 1); then, second electric discharge machining is conducted many times for chamfering of slit intersection at a higher precision (see FIG. 2). In this case, by selecting at least one electric discharge machining condition of pulse current, voltage applied, time, and times of electric discharge machining, it is possible to control the shape of R and the dimension of R.

Accordingly, in the above manufacturing method, a lower condition of electricity (e.g. a smaller pulse current) than in the above-explained manufacturing method can be used by conducting repeated electric discharge machining (this is an effect in addition to the one obtained in the above-explained manufacturing method); therefore, by conducting repeated electric discharge machining while the risk of rib breakage of discharging electrode is reduced, burrs can be removed and R surface formation at slit intersection corner can be effected at a higher precision. Further, as shown in FIG. 5(b), chamfering at slit intersection B can be conducted reliably; as a result, there can be reduced die breakage caused by stress concentration which generates during extrusion. Furthermore, removal (discharge) of chips from the start of electrical electric discharge machining to its completion becomes good.

In the above method for manufacturing a die, the pulse currents in the first and second electric discharge machining are each preferably 1 to 20 A, more preferably 1 to 15 A, further preferably 1 to 10 A.

In the above method for manufacturing a die, the second electric discharge machining is conducted at least once, preferably 20 to 1,000 times, more preferably 200 to 800 times, further preferably 500 to 700 times. The reason is that when the times of repeated electric discharge machining is less than 20, it is relatively difficult to conduct chamfering so that each corner of slit intersection comes to have an appropriately curved surface part (a R shape part). Meanwhile, when the repeated times of repeated electric discharge machining is more than 1,000, the electric discharge machining time is long and the productivity of electric discharge machining is hindered.

In the above method and also in the method for manufacturing a die to be used for formation of honeycomb structure according to the present invention, the radius of curvature at slit intersection is preferably 0.03 mm to 0.15 mm, more preferably 0.03 mm to 0.12 mm, further preferably 0.03 to 0.1 mm in the case of a carrier having a rib thickness of 50 μm and a cell density of 900 cells/in$^2$, and is preferably 0.03 mm to 1.2 mm, more preferably 0.03 mm to 1 mm, further preferably 0.03 to 0.8 mm in the case of a carrier having a rib thickness of 500 μm and a cell density of 100 cells/in$^2$. The reason is as follows. When the radius of curvature is less than 0.03 mm and when partition wall breakage has occurred in the honeycomb structure manufactured with such a die, particularly near its outer wall, stress concentration tends to take place, resulting in a reduced isostatic strength. Meanwhile, when, in a carrier having a rib thickness of 50 μm and a cell density of 900/in$^2$, the radius of curvature is more than 0.15 mm or when, in a carrier having a rib thickness of 500 μm and a cell density of 100/in$^2$, the radius of curvature is more than 1.2 mm, too much puddle concentrates at each intersection and, particularly in the case of a die wherein back holes are arranged in every other portion, the size of slit crossing portion is too large, which disturbs the supply balance of puddle, greatly deforms the ribs formed and causes a reduction in isostatic strength. In the case of a carrier having a large porosity, there is no sufficient compression bonding of puddle at the rib portion and there appears breakage of rib during extrusion; thus, no effect is obtained for solution of the problems.

Figure 11:
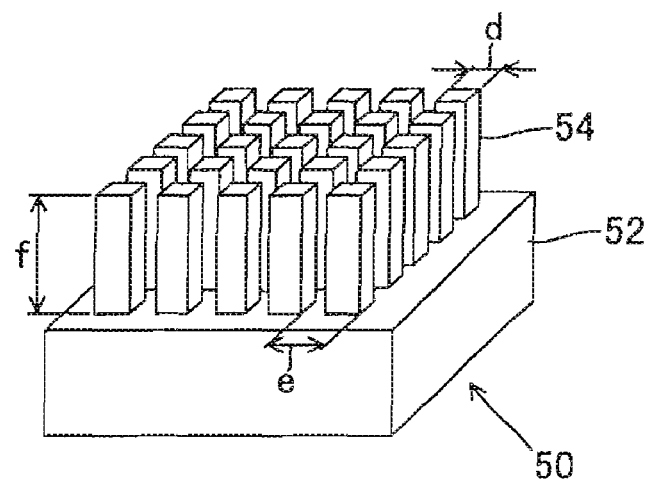
FIG. 11 is a rough perspective view showing a discharging electrode (a rib electrode for electric discharge machining).

In the method for manufacturing a die to be used for formation of honeycomb structure according to the present invention, it is preferred to use, in the first electric discharge machining, a rib electrode for electric discharge machining, such as shown in FIG. 11, as an unused electrode 40 shown in FIG. 6 or FIG. 7. The reason is as follows. That is, the rib electrode has a square or triangular shape and can be produced in a combination of straight lines; therefore, it can be produced at a low cost and at a high precision by grinding or the like and each R shape at several tens of thousands of slit intersection corners can be produced very effectively by electric discharge machining, with no variation. Further, the rib electrode is essential in order to remove each corner 30 with a high precision to change it into a C surface shape 33 as an initiation step for forming an R shape at said each corner 30 of slit sections.

Figure 2:
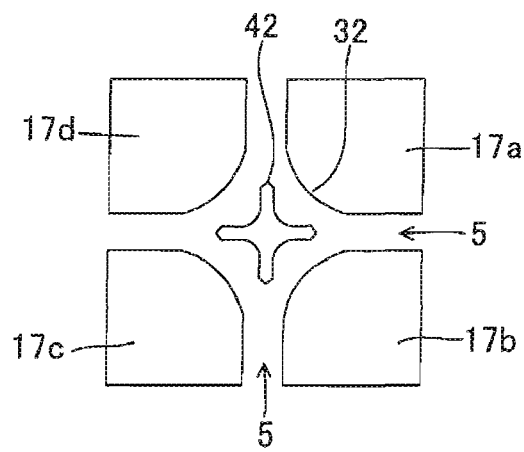
FIG. 2 shows an example of the method for manufacturing a die to be used for formation of honeycomb structure according to the present invention, and is a front view schematically showing a state of slit intersection in electric discharge machining (second electric discharge machining) after first electric discharge machining.

As shown in FIG. 2, the discharging electrode 42 obtained after the first electric discharge machining has a shape on which the appearance of slit intersection after first electric discharge machining (see slit blocks 17a to 17d) has been transcribed, and is chamfered at the transcribed part.

In the method for manufacturing a die to be used for formation of honeycomb structure according to the present invention, it is preferred to use, in the second electric discharge machining, an electrode which was used in the first electric discharge machining and where the square shape (see, an electrode 40 of FIG. 1) has changed into a shape of discharging electrode 42 shown in FIG. 2, from the standpoints of recycling and formation of R shape at a high precision.

Figure 4:
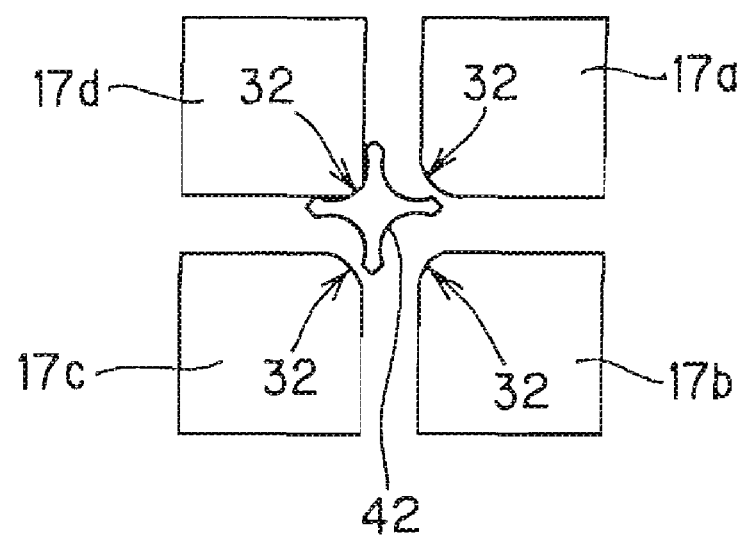
FIG. 4 shows other example of the method for manufacturing a die to be used for formation of honeycomb structure according to the present invention, and is a front view schematically showing a state of slit intersection in electric discharge machining (second electric discharge machining) after first electric discharge machining.

In the method for manufacturing a die to be used for formation of honeycomb structure according to the present invention, it is more preferred to conduct, as shown in FIG. 4, electric discharge machining (second electric discharge machining) while the discharging electrode obtained after the first electric discharge machining is brought close to the removed corner part 32 of slit intersection. Thereby, change of the chamfered part of slit intersection into an appropriately curved surface (a R shape) can be made at a high precision and stably.

In the die to be used for formation of honeycomb structure [see FIGS. 5(a) and 5(b)], obtained by the method for manufacturing a die to be used for formation of honeycomb structure according to the present invention, it is preferred that the precision of slit width is at least ±10 μm or less, preferably ±3 μm or less, more preferably ±2 μm or less, further preferably ±1 μm or less, and the precision of slit pitch is at least ±10 μm or less, preferably ±3 μm or less, more preferably ±2 μm or less, further preferably ±1 μm or less. It is because, when the die to be used for formation of honeycomb structure has a higher precision, a honeycomb structure of higher quality can be extruded with the die.

In the die 1 used for formation of honeycomb structure according to the present invention, the die base 2 is a die precursor obtained by lamination and bonding of two plate-shaped members 3 and 4 wherein the above-mentioned slits 5 and back holes 6 are formed. The two plate-shaped members 3 and 4 constituting the die precursor comprises a first member 3 which becomes one face 7 side of the die base 2 and is made of a tungsten carbide-based super hard alloy containing at least tungsten carbide, and a second member 4 which becomes the other face 8 side of the die base 2 and is made of a metal material which may cause, by cooling of austenite phase, at least one phase transformation of three phase transformations, i.e. martensite transformation, bainite transformation and perlite transformation. The tensile and compression stresses at the bonding surface of the two plate-shaped members 3 and 4 constituting the die precursor are each 1,000 MPa or less (preferably 500 MPa or less).

Thus, in the die base 2 used in the die 1 used for formation of honeycomb structure according to the present invention, in the one face 7 side, slits 5 having a direct relation with the precision of extrusion (forming precision) are formed by using the first member 3 made of a tungsten carbide-based super hard alloy superior in abrasion resistance and can alleviate the abrasion of slits 5. In the other face 8 side, back holes are formed by using the second member 4 made of a metal material which may cause, by cooling of austenite phase, at least one phase transformation of three phase transformations, i.e. martensite transformation, bainite transformation and perlite transformation, allows for relatively easy formation of back holes 6 for introducing a forming material thereinto, and has a mechanical strength at least required for extrusion die.

Figure 10:
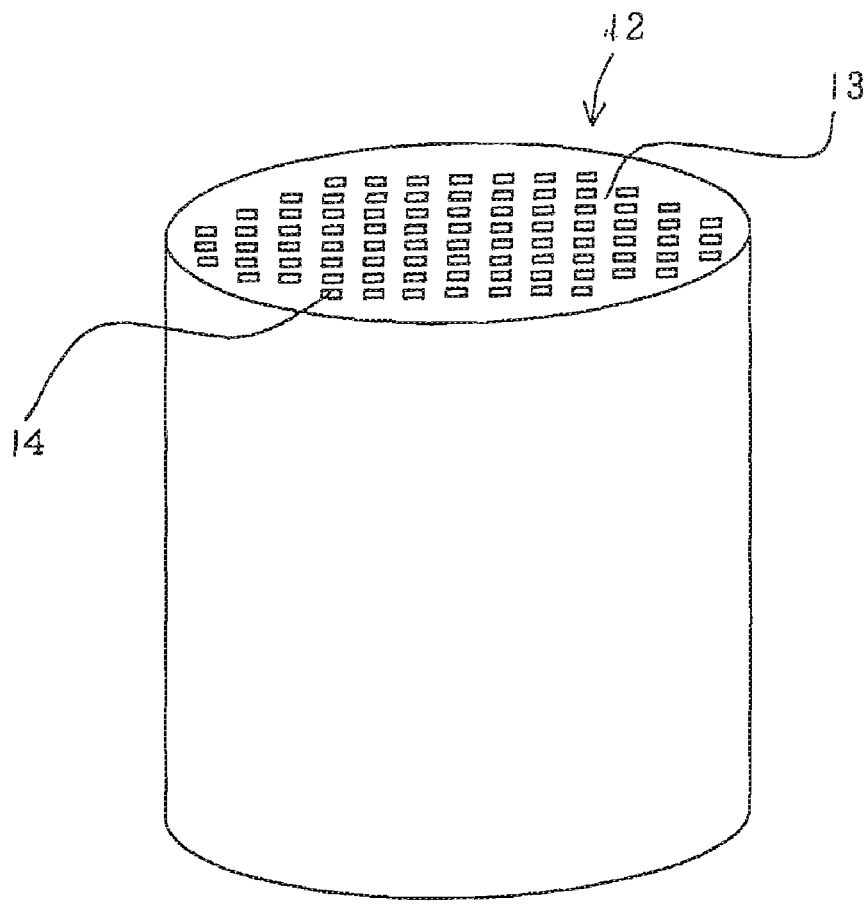
FIG. 10 is a rough perspective view showing a honeycomb structure formed by extrusion using a die for formation of honeycomb structure.

Incidentally, as shown in, for example, FIG. 10, the honeycomb structure obtained by extrusion using the die 1 of the present invention has porous partition walls 13 which surround and form a plurality of cells 14 each functioning as a fluid passage. Such a honeycomb structure 12 can be preferably used, for example, as a carrier for catalyst used in internal combustion engine, boiler, chemical reactor, reformer of fuel cell, etc., or as a filter for capture of particulate matter present in exhaust gas.

Figure 5:
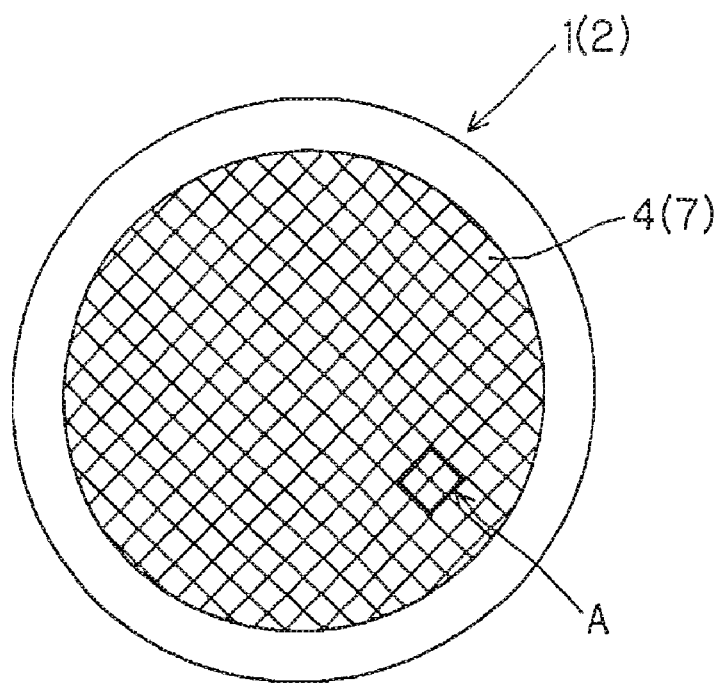
FIG. 5 shows an example of the die to be used for formation of honeycomb structure according to the present invention.
Figure 5:
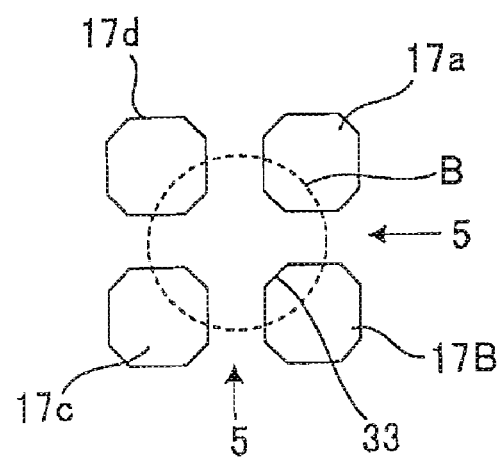

In the method for manufacturing a die to be used for formation of honeycomb structure according to the present invention, electric discharge machining at slit intersection is conducted, for example, by using a discharging electrode (a rib electrode for electric discharge machining) 50 such as shown in FIG. 11, wherein fine ribs 54 (having an electrode rib width of, for example, about 100 to 500 μm) are formed in the shape of pinholder, in order to enable simultaneous electric discharge machining of a plurality of slit intersections [33 in FIG. 5(*b*)].

Figure 8:
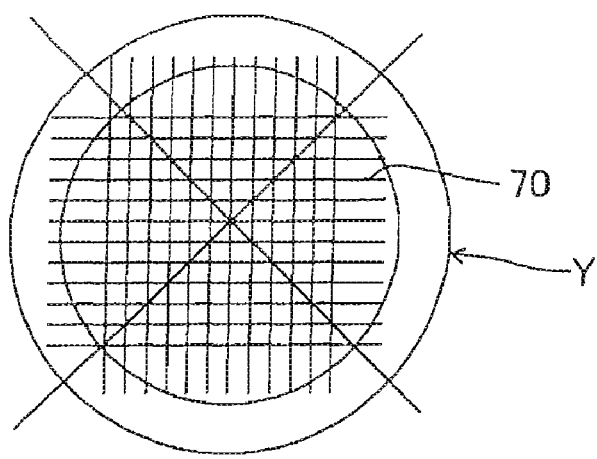
FIG. 8 is a rough view showing a divided discharging electrode.

As the discharging electrode used in the present invention, there is also preferred a discharging electrode 70 such as shown in FIG. 8, whose section is smaller than or equal to the slit formation area Y in the section of die for honeycomb formation and which is divided in 2 or 4 parts in a 45° direction relative to the intersecting direction of slits. The reason for electrode division in parts is as follows. The area of formation of R shape in die is 30 to 300 mm in diameter and is very large in some dies; therefore, when an electrode allowing for R formation at one time is required, it is necessary to prepare about 40,000 to 90,000 square-shaped electrodes when the R shape formation area in die is, for example, 300 mm in diameter; in this case, processing time is very long, an apparatus of very large stroke need be used, the risk of precision deterioration or breakage is high, and such an electrode is unrealistic. An electrode larger than 150 nm in diameter is desired to be produced in a divided form.

The discharging electrode used in the present invention is, for example, an electrode such as shown in FIG. 11, wherein a large number of ribs (rib electrodes) 54 capable of being inserted into the end of the depth of the slit intersections of die for formation of honeycomb structure are formed on a base 52 so that the rib pitch matches the pitch of slit intersection.

The discharging electrode used in the present invention has a width of preferably 1.5 to 3.0 times the diagonal length of slit crossing portion of die for formation of honeycomb structure.

It is desired that, in the discharging electrode used in the present invention, the precision of rib width d is ±5 μm or less and the precision of rib pitch e is ±5 μm or less, so that the die for formation of honeycomb structure can maintain its precision after electric discharge machining.

In manufacturing the above discharging electrode, first, a work is subjected to grinding to produce ribs (rib electrodes) extending from the base (the work). Since the ribs are fine and dense, spraying of grinding fluid has tended to cause rib breakage and no spraying of grinding fluid has tended to cause clogging of wheel stone.

In order to solve the above problem, in manufacturing the discharging electrode used in the present invention, a work is moved to a direction opposite to the direction in which a grinding fluid is applied and a wheel stone is rotated at an rpm of, for example, 8,000 to 13,000 in a direction to which chips are thrown away, whereby a discharging electrode (a rib electrode for electric discharge machining) of high aspect ratio, made of, for example, graphite can be obtained.

Figure 19:
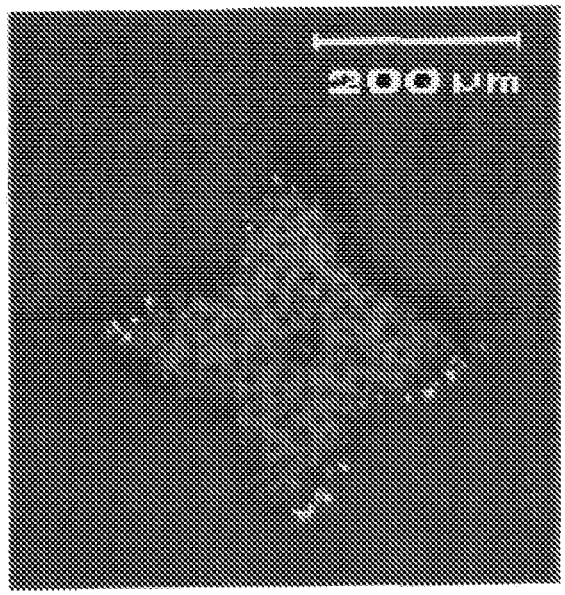
FIG. 19 is a photograph showing the surface shape of the rib front end of the discharging electrode used in Example 6.

The discharging electrode used in the present invention, by being subjected to first electric discharge machining, can be changed to a shape where the appearance of slit intersection after first electric discharge machining (see slit blocks 17*a* to 17*d*) has been transcribed on each of a large number of fine ribs and where the transcribed part is chamfered (see FIG. 2 and FIG. 19). This discharging electrode 42 can be used preferably in the electric discharge machining of a large number of times conducted at a low pulse current.

EXAMPLES

The present invention is described in more detail by Examples. However, the present invention is in no way restricted to these Examples.

(Method for Production of Discharging Electrode)

A large number of ribs were cut out from a work by grinding, to produce a discharging electrode having a square section of 50 mm×50 mm (see FIG. 11). In the grinding, there was used, as the electrode, a copper-tungsten alloy silver-tungsten alloy or graphite and, as the wheel stone, a wheel stone having a sawtooth-like circumference or a diamond wheel. The discharging electrode obtained had a rib width d of 200 μm (170 μm only in Example 2 described later), a rib pitch e of 1.5 mm, and a rib height f of 2.4 mm and was for manufacture of die. Incidentally, in the discharging electrode produced, the precision of rib width was ±3 μm and the precision of rib pitch was ±3 μm.

(Method for Manufacture of Die Base Body)

There was manufactured a die base having two faces, wherein, in one face, honeycomb-shaped slits were formed and, in the other face, back holes for introducing a forming material thereinto, communicating with the slits were formed. As a die precursor to become the die base, there was used a material obtained by laminating and bonding two members (a first member made of a Co super hard alloy containing 20 mass % or less of WC and a second member made of precipitation hardened martensite type stainless steel) so that the tensile and compression stresses at the bonding surface were each 500 MPa.

The shape of the first member was square shape having size of 100 mm×100 mm and thickness of 2.5 mm and the shape of the second member was square shape having 100 mm×100 mm and the thickness of 15 mm. The die base constituting the second member had a layer into which a brazing filler metal had penetrated to a depth of about 0.1 mm. In the present Examples, prior to the bonding of the first member and the second member, back holes and part of slits were formed in the second member, the first member and the second member were bonded, then slits were formed in the first member; thereby, a die base was manufactured.

The back holes were formed in the second member at an opening diameter of 1 mm so that they were positioned at the intersections of lattice-shaped slits. The slits were formed in a square-shaped lattice form by slicing (the wheel stone used: diamond wheel). The width of slit was 120 μm, its depth was 2.5 mm, the distance between adjacent slits was about 1.5 mm and the diagonal length at slit intersection was about 170 μm. Incidentally, the slit pitch precision of the die base was ±10 μm.

Examples 1-2

Method 1 for Manufacture of Dies for Formation of Honeycomb Structure

Figure 9:
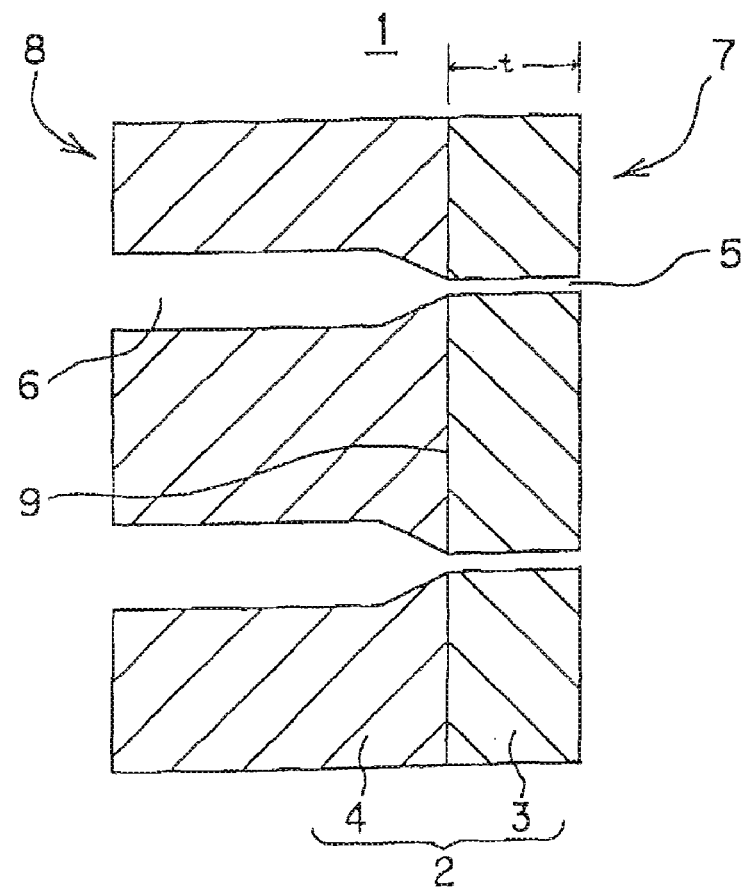
FIG. 9 is an enlarged sectional view schematically showing the die to be used for formation of honeycomb structure according to the present invention.
Figure 13:
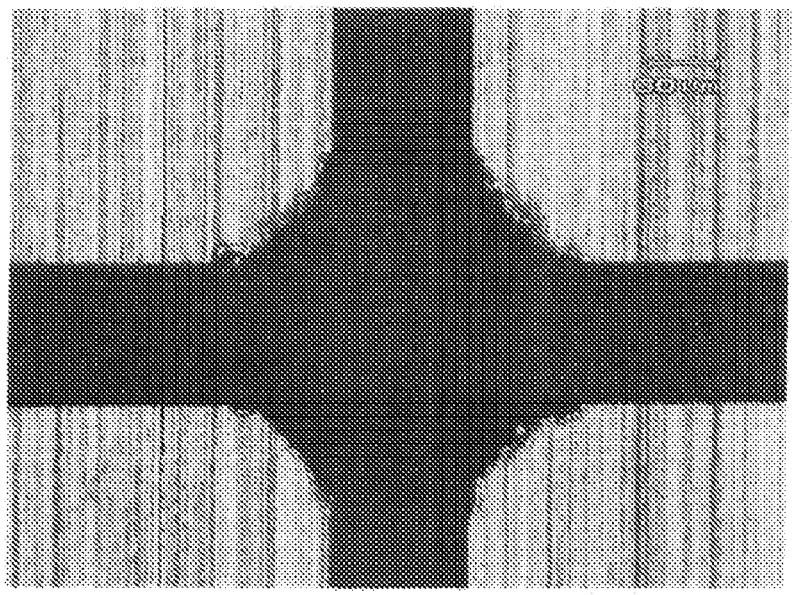
FIG. 13 is a photograph showing the surface shape of the slit intersection in first electric discharge machining (one time), obtained by the method for manufacturing a die to be used for formation of honeycomb structure according to the present invention (Example 1).
Figure 14:
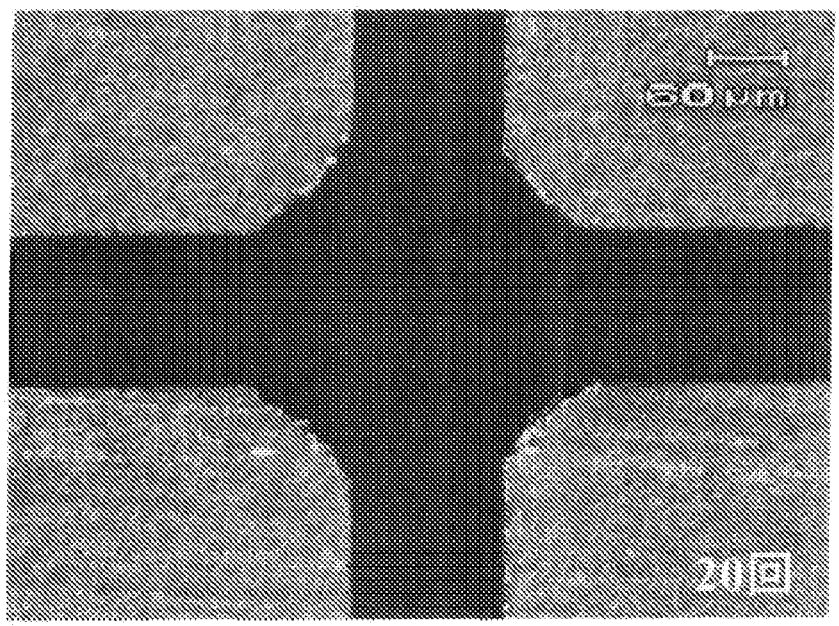
FIG. 14 is a photograph showing the surface shape of the slit intersection in first electric discharge machining (20 times), obtained by the method for manufacturing a die to be used for formation of honeycomb structure according to the present invention (Example 2).
Figure 15:
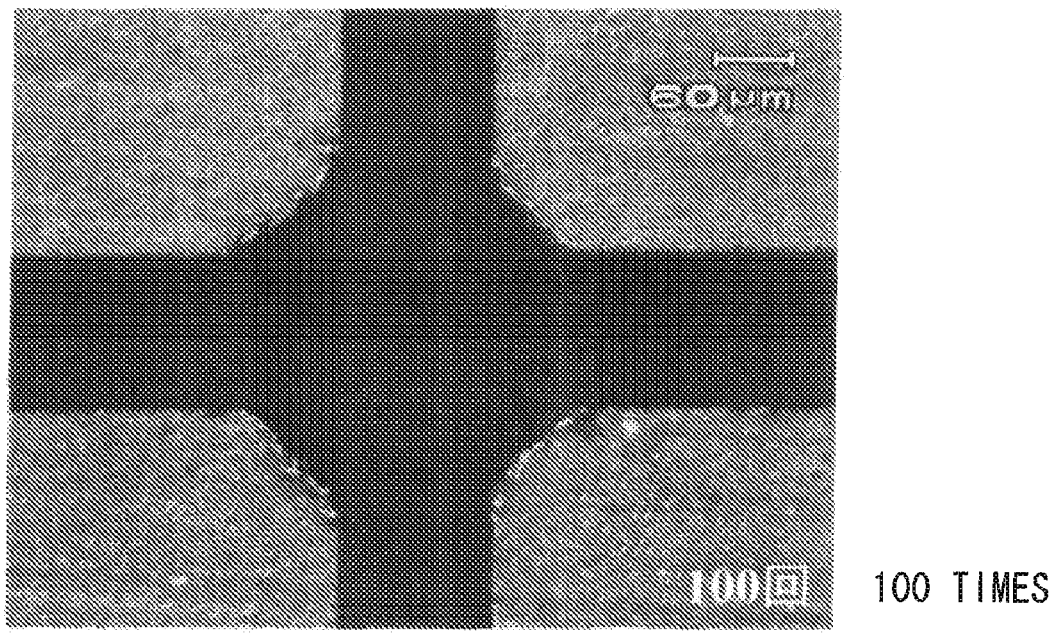
FIG. 15 is a photograph showing the surface shape of the slit intersection in first electric discharge machining (100 times), obtained by the method for manufacturing a die to be used for formation of honeycomb structure according to the present invention (Example 3).
Figure 16:
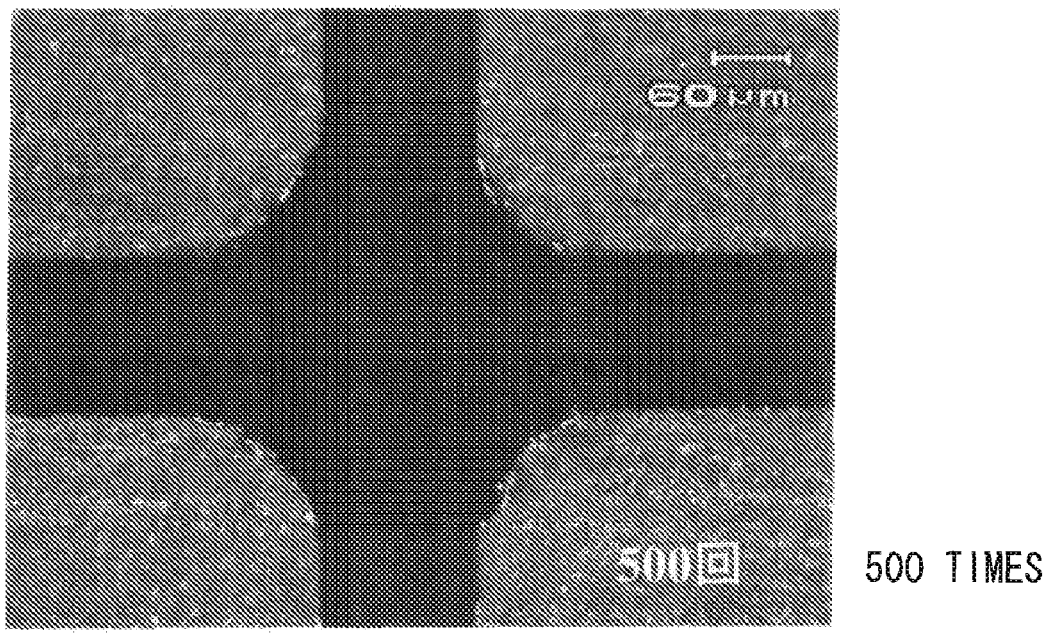
FIG. 16 is a photograph showing the surface shape of the slit intersection in first electric discharge machining (500 times), obtained by the method for manufacturing a die to be used for formation of honeycomb structure according to the present invention (Example 4).
Figure 17:
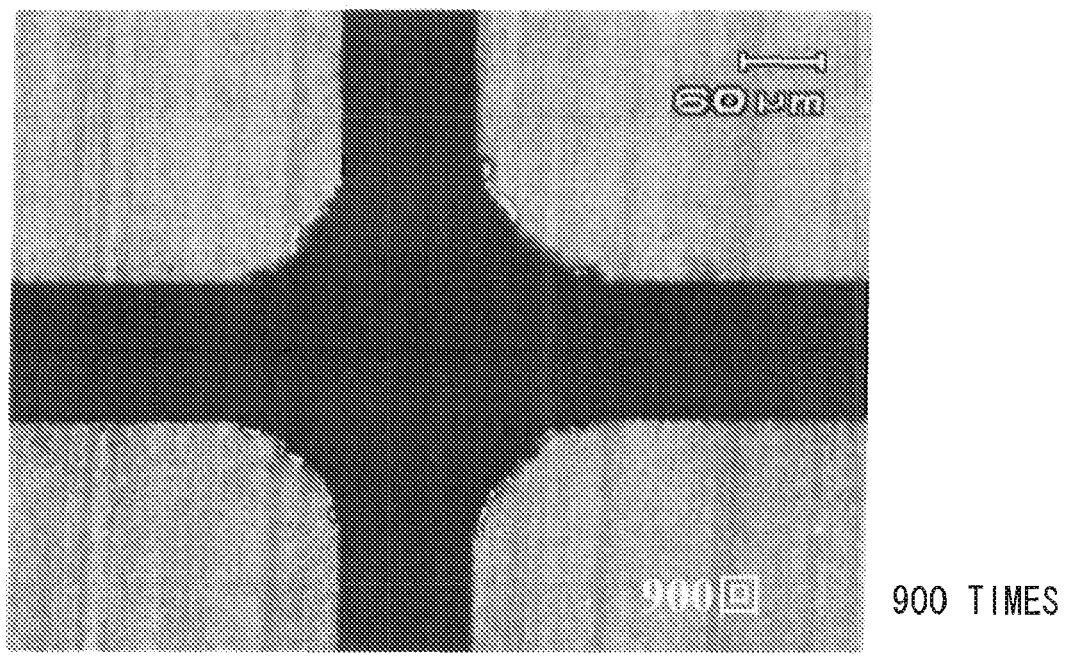
FIG. 17 is a photograph showing the surface shape of the slit intersection in first electric discharge machining (900 times), obtained by the method for manufacturing a die to be used for formation of honeycomb structure according to the present invention (Example 5).
Figure 22:
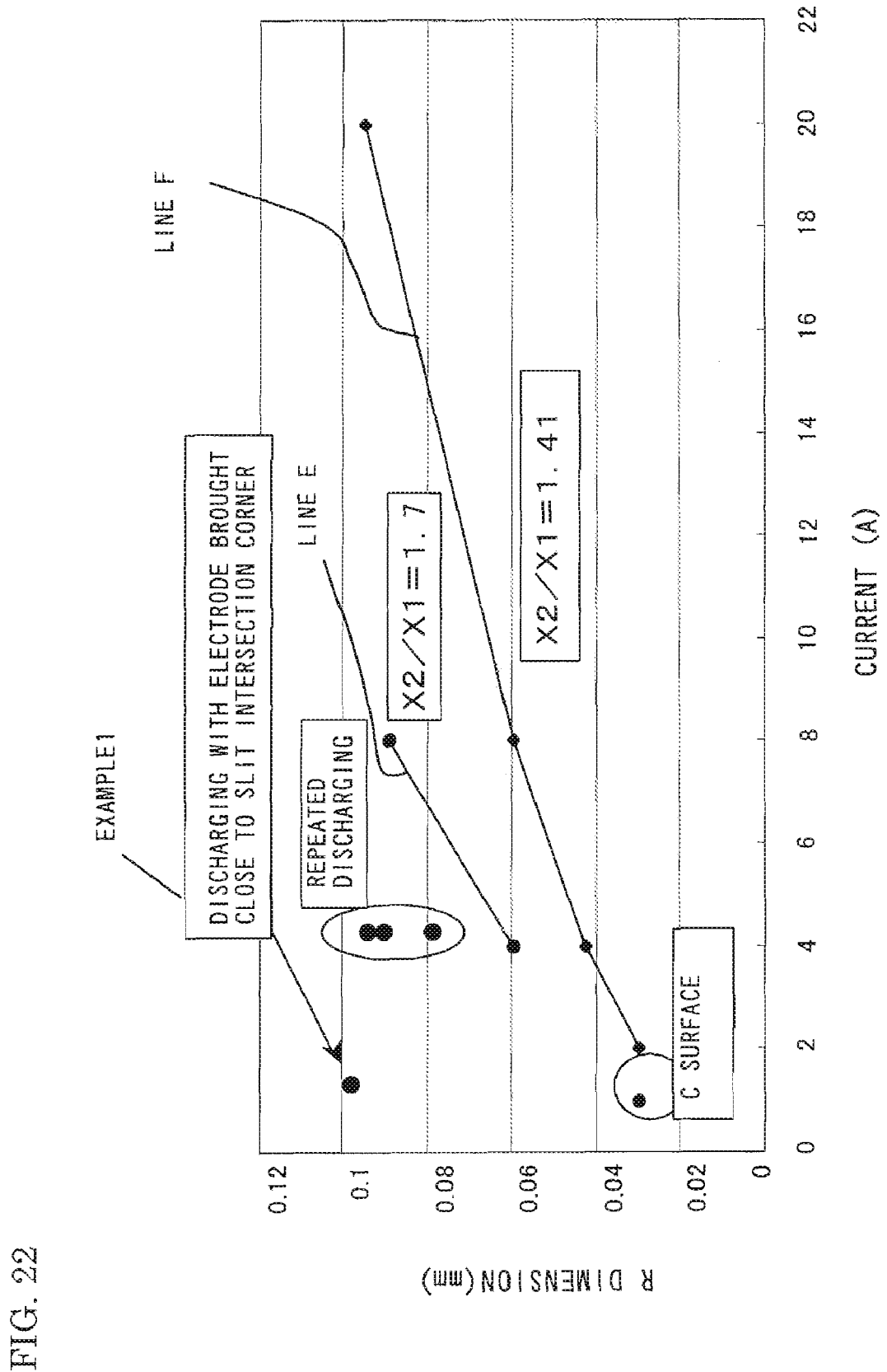
FIG. 22 is a graph showing a relation between pulse current, times of repeated electric discharge machining, and R dimension of corner of slit intersection, obtained in Examples.

The die base obtained above was subjected to electric discharge machining by the use of the discharging electrode obtained above. That is, the electrode was moved down only once to a given depth of the intersections of all the slits present in a die slit area of 86 mm in diameter and the intersections were subjected to simultaneous electric discharge machining [pulse current: 8 A (Example 1) and 2 A (Example 2), pulse width: 2 μsec, slit depth of electric discharge machining: 2.4 mm (see t of FIG. 9)]. The surface shape of each slit intersection of the die for formation of honeycomb structure, after electric discharge machining was examined using a microscope. The results are shown in Table 1 and the result of Example 1 are shown in FIG. 13 and FIG. 22.

Examples 3-6

Method 2 for Manufacture of Dies for Formation of Honeycomb Structure

The die base obtained above was subjected to electric discharge machining by the use of the discharging electrode obtained above. That is, the intersections of all the slits present in a die slit area of 86 mm in diameter were subjected to simultaneous electric discharge machining (first electric discharge machining) [pulse current: 4 A, pulse width: 2 μsec, slit depth of electric discharge machining: 2.4 mm (see t of FIG. 9)]; then, with the discharging electrode used above, the slit intersections were subjected to repeated electric discharge machining (second electric discharge machining) of 20 times, 100 times, 500 times or 900 times under the same conditions as in the first electric discharge machining [current: 4 A, pulse width: 2 μsec, slit depth of electric discharge machining: 2.4 mm (see t of FIG. 9)]. The surface shape and radius of curvature of each slit intersection of the die for formation of honeycomb structure, after electric discharge machining were examined using a microscope. The results are shown in Table 1 and FIGS. 14-17 and FIG. 22. Incidentally, in FIG. 22, line E indicates a relation between pulse current and R dimension when x2/x1 was 1.7 and the repeated times of repeated electric discharge machining was 20 or more.

Comparative Example 1

Method 3 for Manufacture of Die for Formation of Honeycomb Structure

The die base obtained above was subjected to electric discharge machining by the use of the discharging electrode obtained above. That is, the electrodes were moved down together only once to a given depth of intersections of a given portion [e.g. one of four divided parts shown in FIG. 8] of the slits present in a die slit area of 86 mm in diameter and these intersections were subjected to simultaneous electric discharge machining [pulse current: 1 A, pulse width: 2 μsec, slit depth of electric discharge machining: 2.4 mm (see t of FIG. 9)]. The surface shape and radius of curvature of each slit intersection of the die for formation of honeycomb structure, after electric discharge machining was examined using a microscope. The result is shown in Table 1 and FIG. 18.

TABLE 1

| | Radius of curvature of slit intersection (μm) | Times of electric discharge machining | Time of electric discharge machining (hr) |
|---|---|---|---|
| Example 1 | 88 | 1 | 11 |
| Example 2 | 30 | 1 | 0.5 |
| Example 3 | 60 | 20 | 15 |
| Example 4 | 83 | 100 | 20 |
| Example 5 | 94 | 500 | 50 |
| Example 6 | 100 | 900 | 80 |
| Example 7 | 100 | 1 (electric discharge machining with electrode brought | 20 |

TABLE 1-continued

| | Radius of curvature of slit intersection (μm) | Times of electric discharge machining | Time of electric discharge machining (hr) |
|---|---|---|---|
| | close to die intersection corner) | | |
| Comp. Example 1 | — | 1 | 13 |

Discussion

Examples 1-6

The followings were confirmed from the result of Table 1. In Example 1 and Example 2, slit intersection corners could have a nearly R shape by setting the pulse current of electric discharge machining at 8 A (high) in Example 1 and at 2 A in Example 2 and conducting first electric discharge machining (see Example 1: FIG. 13). In Examples 3 to 5, by increasing the times of concentrated electric discharge machining to each slit intersection corner at a pulse current of 4 A, the corner gradually came to have a R shape and an improved radius of curvature (see FIGS. 14 to 17). In Comparative Example 1, the pulse current of first electric discharge machining was low (1 A) and was not sufficient, and no R shape could be obtained at slit intersection corner (see FIG. 18). As understood from the "repeated electric discharge machining" in FIG. 22, an improvement in radius of curvature was obtained only by an increase in pulse current from 2 A to 4 A, when the times of repeated electric discharge machining was 20 or more.

Example 7

Method 3 for Manufacture of Die for Formation of Honeycomb Structure

Figure 20:
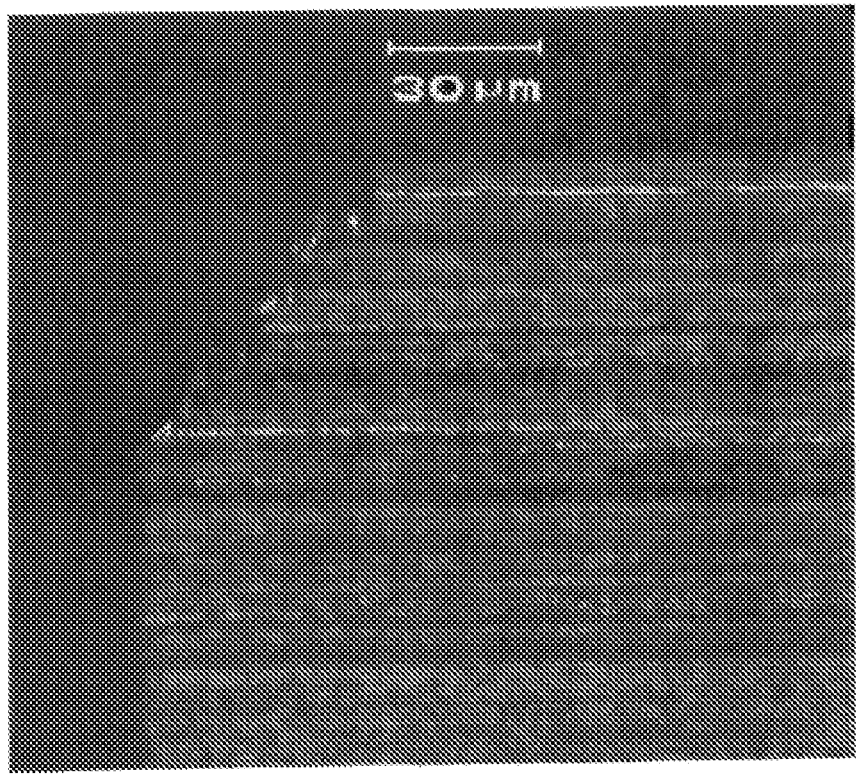
FIG. 20 is a photograph showing the surface shape (C surface shape) of the slit intersection (slit block) before electric discharge machining, in Example 6.
Figure 21:
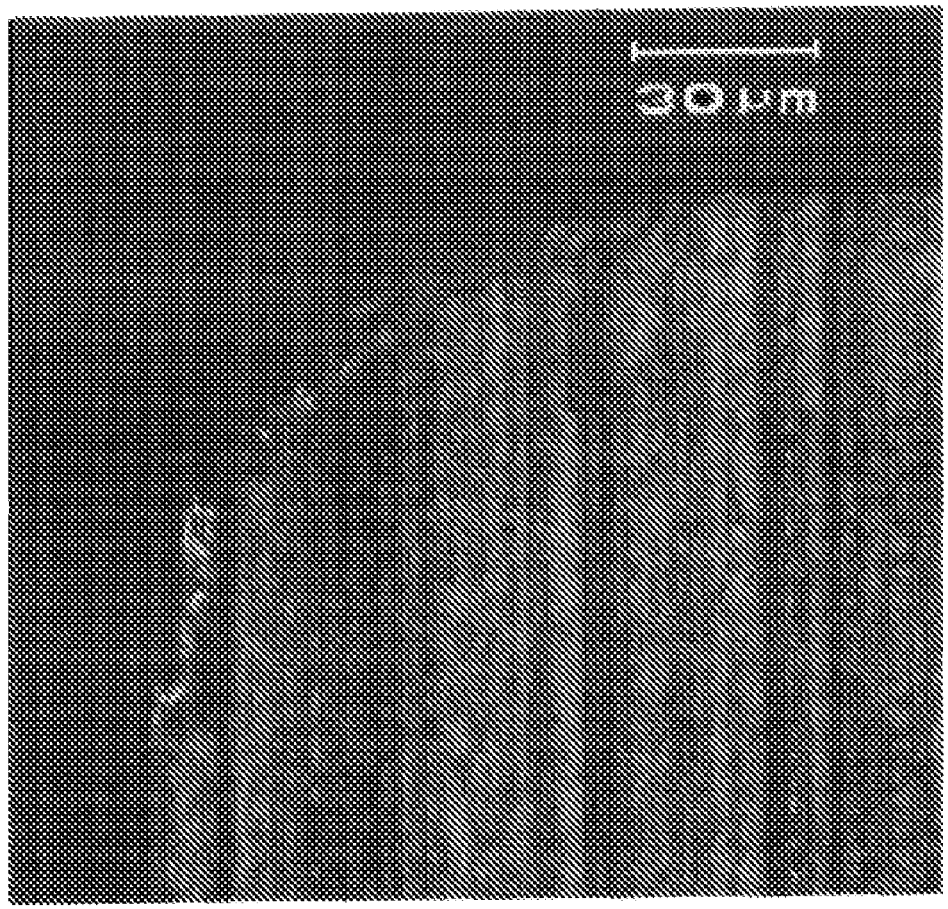
FIG. 21 is a photograph showing the surface shape (R shape) of the slit intersection (slit block) after electric discharge machining, in Example 6.

A discharging electrode was subjected to first electric discharge machining and then examined for its sectional shape using a measurement microscope (a product of Olympus Optical Co., Ltd.). The result is shown in FIG. 19. Then, the discharging electrode shown in FIG. 19 was subjected to second electric discharge machining with the electrode being brought close to a removed corner part 33 (C surface part) of slit intersections, as shown in FIG. 4. The surface shapes of slit intersection (slit block) corner before and after second electric discharge machining were examined using a measurement microscope (a product of Olympus Optical Co., Ltd.). The results are shown in FIG. 20 and FIG. 21. In FIG. 20, each slit intersection (slit block) corner has a C surface shape; however, after the second electric discharge machining, each corner had a R shape of high precision (radius of curvature: about 100 μm) and stability.

There was mixed a forming material containing mainly a ceramic (composed mainly of alumina, kaolin and talc) and water, to prepare a body. The body was kneaded to obtain a puddle for honeycomb formation. The puddle was inserted into an oil-pressure extruder provided with one of the following dies [1] to [5], to extrude a honeycomb formed body. In this case, extrusion was carried out for a long time until each die caused any problem associated with extrusion. In extrusion, the honeycomb formed body obtained was allowed to have an outer wall thickness of 0.5±0.05 mm so that the honeycomb formed body could be measured reliably for isostatic strength, and those honeycomb structures free from rib breakage or bending were selected.

Die [1]: a super hard die using a die base made of a tungsten carbide-based super hard alloy and, as shown in FIG. 18, having C surface corners and burrs at each slit intersection (Comparative Example 1).

Die [2]: an ordinary die wherein a stainless steel-made die base body has thereon a coating layer (an electrolytic plating layer) (Comparative Example 2). R dimension: 60 μm Die [3]: a super hard die using a die base made of a tungsten carbide-based super hard alloy and, as shown in FIGS. 12(a) and 12(b), having sharp corners at each slit intersection (Comparative Example 3). No R Die [4]: a super hard die using a die base made of a tungsten carbide-based super hard alloy and, as shown in FIGS. 5(a) and 5(b), having appropriately curved surface parts (R shape parts) at each slit intersection (Example 2). R dimension: 30 μm Die [5]: a super hard die using a die base made of a tungsten carbide-based super hard alloy and, as shown in FIGS. 5(a) and 5(b), having appropriately curved surface parts (R shape parts) at each slit intersection (Example 7). R dimension: 100 μm Die [6]: a super hard die using a die base made of a tungsten carbide-based super hard alloy and, as shown in FIGS. 5(a) and 5(b), having appropriately curved surface parts (R shape parts) at each slit intersection (Example 4). R dimension: 83 μm The honeycomb formed bodies obtained were subjected to hot-air drying and microwave drying and then measured for isostatic strength. The measurement of isostatic strength was conducted by compressing each dried honeycomb formed body under hydrostatic pressure and examining the strength when the breakage of partition wall took place, according to JASO specification M 505-87. The results are shown in Table 2.

TABLE 2

| | Isostatic strength of honeycomb formed body (MPa) |
|---|---|
| Example 2 | 7.3 |
| Example 4 | 7.8 |
| Example 7 | 7.4 |
| Comp. Example 1 | 4.2 |
| Comp. Example 2 | 7.6 |
| Comp. Example 3 | 3.5 |

It was confirmed from the result of Table 2 that, with dies having a R dimension of 30 μm or more, the honeycomb formed bodies obtained had an isostatic strength about equal to the case when the ordinary coated die of Comparative Example 2 was used and, meanwhile, with the die of Comparative Example 3 having no R, the isostatic strength obtained was considerably low compared with the case of using the dies having a R dimension of 30 μm or more. It was also confirmed that, as to the life of die, the dies whose slit portions were made of a super hard alloy, had a long life of 20 or more times that of the die of Comparative Example 2.

Example 8

A relation between the pulse current applied and the R dimension of slit intersection corner obtained was measured for a case when one time of electric discharge machining was conducted at various pulse currents at x2/x1 of 1.41, as in Example 2. The result is shown using a line F in FIG. 22. It was found from the result that, when a high current was applied, the extent of electrode breakage increased (the breakage occurred at 20 A or higher) but no large R was obtained and further that an appropriate R dimension was obtained by conducting, at a low current, repeated electric discharge machining or electric discharge machining with electrode brought close to slit intersection corner.

INDUSTRIAL APPLICABILITY

The method for manufacturing a die for formation of honeycomb structure according to the present invention can realize high formability and is superior in life and abrasion resistance, and can realize high formability. Since the slit portion of die base body is superior particularly in abrasion resistance, a honeycomb structure can be formed at a low cost. The method for manufacturing a die for formation of honeycomb structure according to the present invention can easily produce a die for formation of honeycomb structure.

The technique of the present invention can be applied even to a die whose slit portion is made of a material other than super hard alloy, as long as the material is a conductive material.

The invention claimed is:

1. A method for manufacturing a die to be used for formation of a honeycomb structure, the die having a die base having two faces, honeycomb-shaped slits being formed in one face and back holes communicating with the slits being formed in the other face in order to introduce a forming material thereinto, at least slit portions of the die being made of a super hard alloy, the method comprising: forming the slits by grinding or electric discharge machining;

disposing a discharging electrode having a square-shaped section near each crossing portion of the slits; and conducting electric discharge machining from an upper side of each slit toward a depth direction of each slit down to the depth of the slit.

2. A method for manufacturing a die to be used for formation of the honeycomb structure according to claim 1, wherein the discharging electrode is an electrode of approximately square shape having a side length at least equal to or larger than a slit width, and the discharging electrode is disposed so that a diagonal direction of the discharging electrode and a diagonal direction of each slit crossing portion make an approximately 45 degree angle.

3. A method for manufacturing a die to be used for formation of the honeycomb structure according to claim 1, wherein each slit intersection corner is formed so as to have an R shape by deciding at least one electric discharge machining condition selected from pulse current, applied voltage, time length and number of times electric discharge machining is performed.

4. A method for manufacturing a die to be used for formation of the honeycomb structure according to claim 1, wherein each slit intersection corner has a radius of curvature of 0.03 to 1.2 mm.

5. A method for manufacturing a die to be used for formation of the honeycomb structure according to claim 1, wherein at least the slit portions of the die are made of a tungsten carbide-based super hard alloy.

6. A method for manufacturing a die to be used for formation of the honeycomb structure, according to claim 1, wherein the discharging electrode is formed so as to have a section smaller than or equal to a section of each slit formed in the die and the discharging electrode is divided in two or four parts in a 45° direction relative to an intersecting direction of the slits.

7. A method for manufacturing a die to be used for formation of the honeycomb structure according to claim 1, wherein, conducting electric discharge machining from the upper side of each slit toward the depth direction of each slit further comprises:

conducting a first electric discharge machining to remove each slit intersection corner and then conducting a second electric discharge machining at least once to allow each corner of slit intersection corner to have an R shape.

8. A method for manufacturing a die to be used for formation of the honeycomb structure according to claim 7, wherein the second electric discharge machining is carried out by using at least the discharging electrode which was used as the first electric discharge machining.

9. A method for manufacturing a die to be used for formation of the honeycomb structure according to claim 7, wherein a discharging electrode subjected to the first electric discharge machining has a shape corresponding to a slit crossing portion after the first electric discharge machining has been transcribed and is chamfered at the transcribed part.

10. A method for manufacturing a die to be used for formation of the honeycomb structure according to claim 7, wherein electric discharge machining is conducted while a discharging electrode having a shape corresponding to a slit crossing portion after the first electric discharge machining has been transcribed and is chamfered at the transcribed part, is being brought close to the slit crossing portion.

11. A method for manufacturing a die to be used for formation of the honeycomb structure according to claim 7, wherein an unused discharging electrode is used in the first electric discharge machining.

* * * * *